(12) United States Patent
Meske et al.

(10) Patent No.: US 10,495,022 B2
(45) Date of Patent: Dec. 3, 2019

(54) PISTON FOR AN INTERNAL COMBUSTION ENGINE

(71) Applicant: FEDERAL-MOGUL NURNBERG GMBH, Nuremberg (DE)

(72) Inventors: Ralf Meske, Schwabach (DE); Carolin Kleinlein, Nuremberg (DE); Harald Mergler, Nuremberg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 95 days.

(21) Appl. No.: 15/576,972

(22) PCT Filed: Apr. 29, 2016

(86) PCT No.: PCT/EP2016/059639
§ 371 (c)(1),
(2) Date: Nov. 27, 2017

(87) PCT Pub. No.: WO2016/188704
PCT Pub. Date: Dec. 1, 2016

(65) Prior Publication Data
US 2018/0156157 A1   Jun. 7, 2018

(30) Foreign Application Priority Data
May 26, 2015 (DE) .......................... 10 2015 209 591

(51) Int. Cl.
*F02F 3/02* (2006.01)
*F16J 1/04* (2006.01)

(52) U.S. Cl.
CPC ................. *F02F 3/022* (2013.01); *F16J 1/04* (2013.01)

(58) Field of Classification Search
CPC ................. F16J 1/04; F02F 3/022; F02F 3/00
See application file for complete search history.

(56) References Cited

U.S. PATENT DOCUMENTS

| | | | | |
|---|---|---|---|---|
| 5,701,803 A | * | 12/1997 | Lutz ......................... | F02F 3/022 |
| | | | | 123/193.6 |
| 2006/0037577 A1 | * | 2/2006 | Procknow ............. | F02F 1/4285 |
| | | | | 123/193.5 |
| 2013/0233270 A1 | * | 9/2013 | Brandt .................. | F02F 3/0076 |
| | | | | 123/193.6 |

FOREIGN PATENT DOCUMENTS

| | | |
|---|---|---|
| DE | 428 008 C | 4/1926 |
| DE | 4414678 A1 | 11/1995 |
| JP | H 03 15649 A | 1/1991 |
| JP | H03179154 A | 8/1991 |
| JP | H0989106 A | 3/1997 |
| JP | 2001304040 A | 10/2001 |
| JP | 2012 136972 A | 7/2012 |

(Continued)

*Primary Examiner* — Thomas E Lazo
(74) *Attorney, Agent, or Firm* — Robert L. Stearns; Dickinson Wright, PLLC

(57) ABSTRACT

The invention relates to a piston for an internal combustion engine having two skirt wall (10), which are connected by connecting walls (14), which bear piston-pin bosses, wherein at least one skirt wall (10) has a greater wall thickness in a region (12) that is central along the piston periphery and in the lateral regions than between the central region (12) and each lateral region and is continuously curved on the inside of the piston in a section perpendicular to the piston axis, and wherein the wall thickness distribution is substantially constant in the direction of the piston axis.

8 Claims, 1 Drawing Sheet

(56) References Cited

FOREIGN PATENT DOCUMENTS

JP 2012136972 A * 7/2012

* cited by examiner

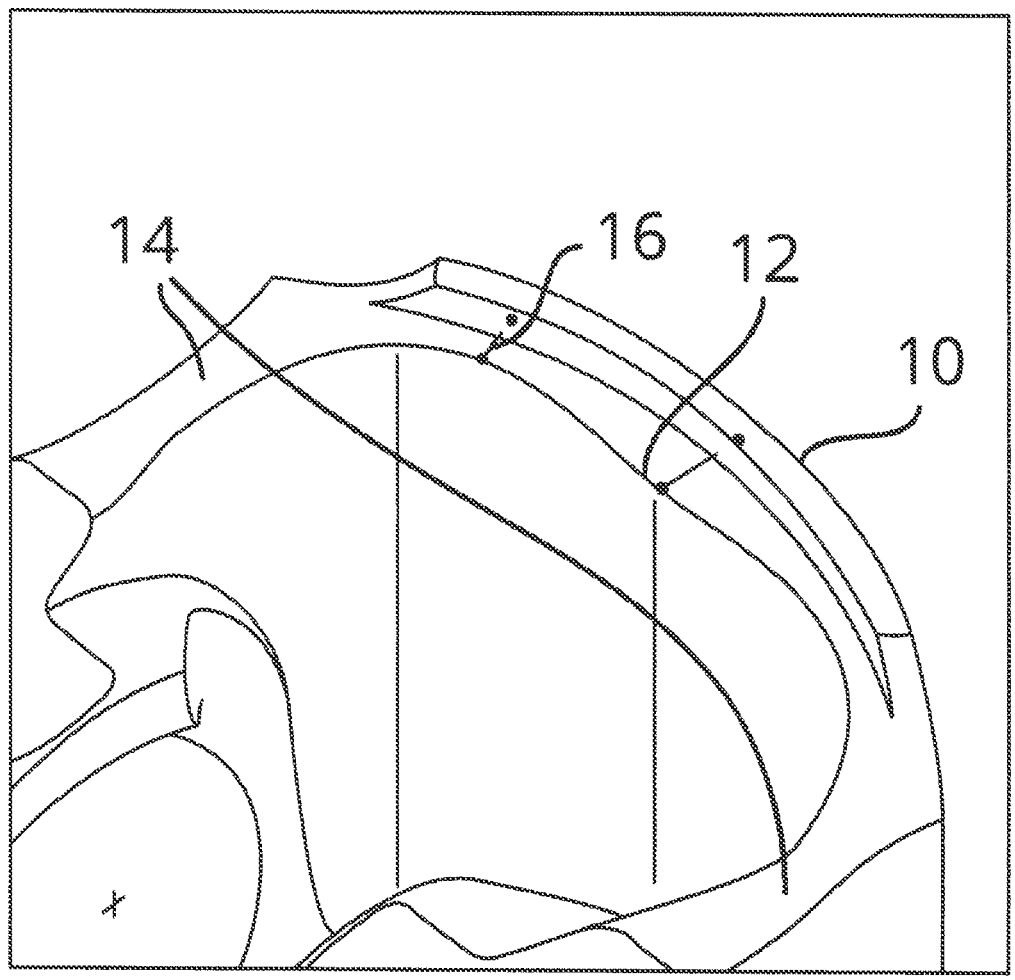

PISTON FOR AN INTERNAL COMBUSTION ENGINE

BACKGROUND

1. Technical Field

The invention relates to a piston for an internal combustion engine.

2. Related Art

Modern pistons for internal combustion engines normally comprise two skirt walls, which correspond to sections of a cylinder lateral surface and are provided to rest against a cylinder bore or liner. The two skirt walls are normally connected by means of connecting walls, which bear the piston pin bosses. The skirt walls are subjected to high lateral forces, and they must thus be correspondingly rigid. It is at the same time always required that pistons for internal combustion engines are as light as possible.

Known as previously used objects are pistons in which the wall thickness of the skirt walls decreases towards the centre thereof (in the circumferential direction) or is constant.

It is furthermore known, for example, from DE 44 14 678 A1 to provide a rib in the centre of the skirt walls.

A similar design is known from JP 2012/136972 A, in which the wall thickness of the skirt walls can additionally increase in the direction of the lateral regions, however the rib that is central in the circumferential direction becomes wider in the direction of the piston crown, at which the piston borders the combustion chamber.

SUMMARY

A piston for an internal combustion engine is provided with improved rigidity of the skirt wall and/or a reduction in weight.

The piston includes at least one skirt wall, the thickness of which is greater in a region that is central in the circumferential direction and in at least one, preferably both, lateral regions that between the central region and the respective lateral region. In a section perpendicular to the piston axis, the contour of at least one skirt wall furthermore has a constant curvature on the inner side and the wall thickness distribution is substantially constant in the direction of the piston axis.

"Lateral region" is to be understood as those regions of the observed skirt wall at which the skirt wall is connected to the respective connecting wall. In other words, if the respective connecting wall is theoretically extended up to the outer side of skirt, the wall thickness of the skirt wall increases even before reaching this extended connecting wall. "Constant curvature" is to be understood to the effect that the second derivative of the contour of the skirt wall is constant, i.e. does not have any jumps, in a section perpendicular to the piston axis, which can be achieved, for example, with a representation by means of spline curves. The central region of the observed skirt wall can, for example, be convexly curved on the inner side of the piston and can transition with a constant curvature into a concave curvature that extends with an increasing wall thickness to the lateral regions via a respective point having the lowest wall thickness.

That the wall thickness distribution is substantially constant in the direction of the piston axis is shown by the fact that the regions having a larger wall thickness, for example in the centre and at the sides, do not become wider in the circumferential direction in the direction of the piston axis, in other words by the fact that every section perpendicular to the piston axis at different points along the piston axis has substantially the same wall thickness distribution and/or the same points of minimum and/or maximum wall thickness, and the wall thickness increases at most as a whole.

It was found that owing to the wall thickness distribution as according to the invention a weight reduction of up to 25% can be achieved for the observed skirt wall whilst the rigidity remains the same, or, if the weight remains the same, a 25% higher rigidity can be achieved. This is not based on the idea of "attaching" a rib to the inner side of the piston in the central region, but rather on the consideration to regard the skirt wall in a section perpendicular to the piston axis as a bending beam having an approximately central single load or a constant area load, for which a constant distribution of stress is to be determined. These considerations lead to the above-described wall thickness distribution along the circumference as well as to the preferred measures described below. In the case of a load in the central region, the outer side of the skirt wall is subjected to compression in this central region and the inner side is subjected to tension, whereas the opposite is the case in the lateral regions. At this location, the outer side is subjected to tension and the inner side to compression.

In view of the above, it has proven to be favourable, for example, to provide the points of minimum wall thickness at between 10% and 30% and between 70% and 90% of the width of the skirt wall in the circumferential direction.

Furthermore, in order to save as much weight as possible, the wall thickness at the point of minimum wall thickness can be 40% to 80% of the wall thickness existing in the centre.

DETAILED DESCRIPTION

As already mentioned, the wall thickness in the direction of the piston axis is substantially constant or increases towards the piston crown.

The above-mentioned considerations with regard to a bending beam furthermore lead to the inner side of the piston having a convex curvature in the central region and/or the lateral regions and/or the points of minimum wall thickness being concavely curved on the inner side of the piston. Reference can inasmuch be made to a double-convex skirt wall in the central region. The radius of curvature of the convex inner side can be comparatively large. It can in particular also become infinitely large such that a flat surface results. The inner side of the piston can also be concavely curved in the central region.

The piston according to the invention is preferably made of aluminium, an aluminium alloy or steel and is equally suitable as a diesel or petrol piston.

The piston according to the invention can advantageously be cast or forged without any problems.

BRIEF DESCRIPTION OF THE DRAWING

An embodiment example will be explained in more detail below by means of the drawing.

The FIGURE shows a perspective bottom view of a skirt wall of the piston according to the invention.

As is apparent from the FIGURE, the skirt wall 10 is, on the one hand, convexly curved on the outer side to rest against a cylinder bore or liner. According to the invention, the wall thickness of the skirt wall 10 is increased in a central region. In the shown embodiment, this increased wall thickness is configured in the form of a convex curvature 12 that is apparent on the inner side of the piston. The wall thickness also increases in the direction of the two lateral regions at which the skirt wall 10 is connected to the respective connecting wall 14, such that a point 16 with the lowest wall thickness occurs in the shown case approximately halfway between the central region and the lateral edge. Here, as well as at the transition to the respective connecting wall 14, the inner side of the piston is concavely curved, whereby the transition from the convex curvature in the central region has a constant curvature, i.e. is configured without jumps in the second derivative.

At the lower end of the skirt wall which can be seen in the FIGURE, i.e. the end having a maximum distance to the piston crown, the wall additionally comprises a step. In other words, in the direction of the piston axis, the outer side of the skirt wall is several millimetres longer over approximately half its wall thickness than the inner side. The cited step serves to accommodate the piston during processing.

The invention claimed is:

1. A piston for an internal combustion engine comprising two skirt walls which are connected by means of connecting walls having pin bosses, wherein at least one of said skirt walls has a greater wall thickness in a region that is central along a piston circumference and in the lateral regions than between the central region and the respective lateral region, and has a constant curvature on an inner side of the piston in a section perpendicular to the piston axis so as to have a continuous behaviour of the curvature across the skirt wall, and wherein the wall thickness distribution is substantially constant in the direction of the piston axis.

2. The piston according to claim 1, wherein a point of minimum wall thickness lies between 10% and 30% as well as between 70% and 90% of the width of the shaft wall in the circumferential direction.

3. The piston according to claim 2, wherein the point of minimum wall thickness has a wall thickness of 40% to 80% of the wall thickness in the central region.

4. The piston according to claim 1, wherein in the direction of the piston axis, the wall thickness as a whole increases or remains the same towards a piston crown.

5. The piston according to claim 1, wherein the inner side of the piston is convexly curved in the central region.

6. The piston according to claim 1, wherein the lateral regions are concavely curved on the inner side of the piston.

7. The piston according to claim 1, wherein the piston is made of aluminium, an aluminium alloy or steel.

8. The piston according to claim 1, wherein the piston is manufactured by casting or forging.

* * * * *